J. J. HERZOG.
NUT LOCK.
APPLICATION FILED AUG. 8, 1911.
1,016,746.
Patented Feb. 6, 1912.
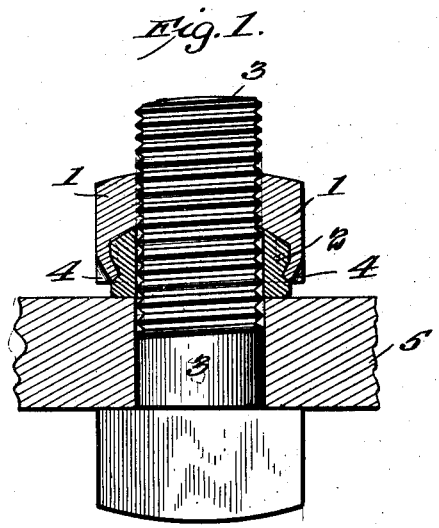
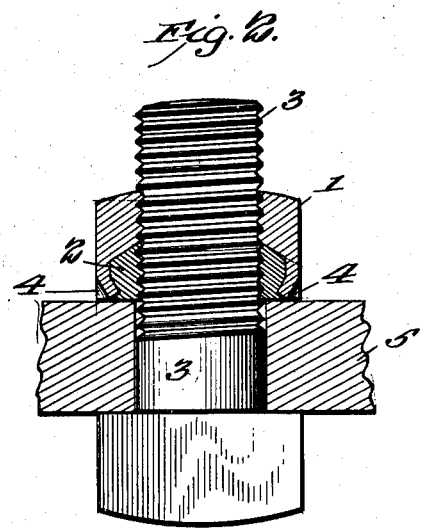
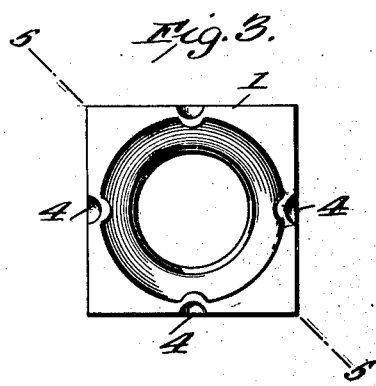
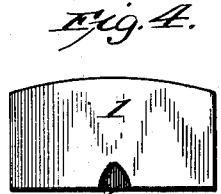
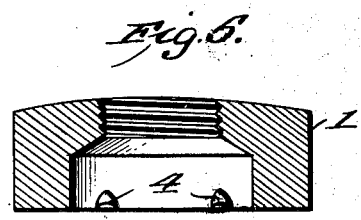
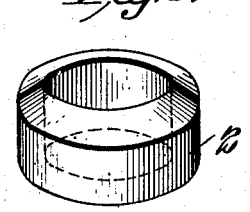
WITNESSES
E. M. Callaghan
Amos W. Hart
INVENTOR
JOSEPH J. HERZOG
BY Munn & Co,
ATTORNEYS

UNITED STATES PATENT OFFICE.

JOSEPH J. HERZOG, OF BALTIMORE, MARYLAND.

NUT-LOCK.

1,016,746.  Specification of Letters Patent.  Patented Feb. 6, 1912.

Application filed August 8, 1911. Serial No. 642,960.

*To all whom it may concern:*

Be it known that I, JOSEPH J. HERZOG, a citizen of the United States, and a resident of Baltimore city, State of Maryland, have invented an Improvement in Nut-Locks, of which the following is a full, clear, and exact description.

My invention is an improvement in that class of nut-locks in which a soft metal washer or bushing is used with a nut proper, the two being made and sold as separate articles and applied separately to a bolt. In my invention, the nut and the soft metal washer are so constructed and connected as to form a single article of manufacture adapted to be sold and used as such.

The details of arrangement, construction, and operation of parts are as hereinafter described, and illustrated in the accompanying drawing, in which, Figure 1 is a sectional view showing a nut applied to a screw-bolt and provided with a bushing of soft metal as it appears before compression; Fig. 2 is a similar view, save that the nut is screwed home and the bushing compressed and expanded as required for locking or sealing the nut; Fig. 3 is an inverted plan view of the nut; Fig. 4 is a side view of the nut; Fig. 5 is a cross section of the nut on the line 5—5 of Fig. 3; Fig. 6 is a perspective view of the soft metal bushing or washer.

As shown, the nut 1 is constructed with a circular cavity or recess in its base, or inner face, for reception of a bushing or washer 2 made of copper, lead or other soft metal or alloys. The bushing (see Fig. 6) is annular in form corresponding to the cavity surrounding the screw-bolt 3 and its upper side is also beveled or inclined from the top downward, and the cavity of the nut is similarly constructed with a beveled shoulder for contact with such portion of the bushing. The thickness of the bushing is such that it projects beyond the base of the nut, as indicated in Fig. 1. In order to secure the bushing firmly in the cavity of the nut so that they are practically inseparable, the base edge of the nut is indented in one or more places, as indicated at 4, whereby interior projecting claws or lugs are formed which project into and engage the bushing. Thus the bushing is firmly secured in the nut and the two form a practically integral article of sale and use. In Fig. 1 the nut with a bushing secured therein is shown applied to a bolt, the inner face of the bushing resting in contact with the bar or plate 5 through which the bolt passes. Upon screwing the nut down, as shown in Fig. 2, the bushing 2 is compressed and thereby expanded inward so as to fill the thread of the bolt. In other words, the bushing is compressed and spread between the bolt and the adjacent wall of the cavity therein, so that the soft metal conforms to all the little irregularities of the thread and thus constitutes an effective metal seal, binding or locking the nut very firmly to the bolt. The nut, which is thus slightly expanded by the compressive action stated, will naturally exert a resilient pressure on the bushing and thereby neutralize vibrations due to any exterior cause. I thus provide a simple, effective, but inexpensive nut-lock which permits the nut to be easily screwed onto a bolt, and then secures it firmly in position. Since the bushing or washer is compressed and flattened by use, it is obvious that the nut provided with it cannot be used again unless a supplemental bushing or washer of soft metal shall be applied. The same would be constructed in annular form but of less thickness than the original bushing, and in practice it would be placed on the bolt under and in contact with the flattened bushing so that it would serve to replace the portion of the latter which has been pressed into the cavity of the nut in the first application.

What I claim is:—

A nut locking device comprising a bolt nut proper formed with a cavity in its inner face and a bushing or washer made of soft material and secured in said cavity and projecting therefrom beyond the base of the nut, the bore of the bushing having a greater diameter than the bore of the nut and the latter having indented side portions, whereby the two parts are secured together and form practically one device adapted for use as such.

JOSEPH J. HERZOG.

Witnesses:
J. B. HARRISON,
H. K. GILES.